United States Patent [19]

Morii et al.

[11] Patent Number: 5,057,367

[45] Date of Patent: Oct. 15, 1991

[54] FLAME RETARDANT AND A FLAME-RETARDANT RESIN COMPOSITION CONTAINING THE SAME

[75] Inventors: Akira Morii; Shunichi Fujimura, both of Ichihara; Kiyoshi Nakayama, Chiba, all of Japan

[73] Assignees: The Furukawa Electric Co., Ltd., Tokyo; Ube Chemical Industries, Co., Ltd., Ube, both of Japan

[21] Appl. No.: 475,179

[22] Filed: Feb. 5, 1990

[30] Foreign Application Priority Data

Apr. 19, 1989 [JP] Japan ..................................... 1-99381
Oct. 6, 1989 [JP] Japan ................................... 1-260232

[51] Int. Cl.$^5$ .............................................. C08K 3/26
[52] U.S. Cl. ..................................... 428/389; 252/609; 524/424; 524/425; 524/427; 524/436; 174/110 SR
[58] Field of Search ............... 524/424, 425, 427, 436; 523/210; 252/609; 428/389; 174/110 SR

[56] References Cited

U.S. PATENT DOCUMENTS

| | | | |
|---|---|---|---|
| 3,339,013 | 8/1967 | Gainer et al. | 524/424 |
| 3,468,839 | 9/1969 | Millane | 524/424 |
| 3,993,607 | 11/1976 | Florence | 524/424 |
| 4,174,340 | 11/1979 | Luders et al. | 524/424 |
| 4,292,188 | 9/1981 | Barone et al. | 252/607 |
| 4,394,471 | 7/1983 | Keogh | 524/424 |
| 4,847,317 | 7/1989 | Dokurno et al. | 524/524 |

FOREIGN PATENT DOCUMENTS

| | | |
|---|---|---|
| 12578 | 6/1980 | European Pat. Off. . |
| 0257796 | 3/1988 | European Pat. Off. . |
| 53-92855 | 8/1978 | Japan . |
| 54-37152 | 3/1979 | Japan . |
| 55-13726 | 1/1980 | Japan . |
| 61-213247 | 9/1986 | Japan . |

OTHER PUBLICATIONS

Microfine Minerals & Chemicals Limited, UL-TRACARB, pp. 1-9, "A Unique Flame Retardant Filler".
Technical Bulletin UC8705-Ultracarb In Flame Retardant PVC Cable.
Technical Bulletin UC8801-The Effect of Ultracarb on the Flame Retardant Properties of Ethylene Vinly Acetate Based Cable Compounds.
Technical Bulletin UC8701-Ultracarb as a Flame Retardant Filler in Polypropylene.

*Primary Examiner*—Veronica P. Hoke
*Attorney, Agent, or Firm*—Frishauf, Holtz, Goodman & Woodward

[57] ABSTRACT

A flame retardant comprising a mixture of 10 to 90% by weight of powder A and 90 to 10% by weight of powder B of magnesium hydroxide, the powder A containing 40 to 70% by weight of a powdered double salt of magnesium carbonate and calcium carbonate and 60 to 30% by weight of powdered basic magnesium carbonate; and a flame-retardant resin composition comprising 100 parts by weight of a thermoplastic resin and 30 to 300 parts by weight of the flame retardant. Preferably, the double salt is huntite, and the basic magnesium carbonate consists essentially of hydromagnesite. It is preferred to treat the flame retardant, in the form of a powder mixture, with a surface treatment agent. The flame-retardant resin composition is adapted for use as a sheath or insulation for an electric wire or cable, a fire-arresting material, or a wall material.

36 Claims, No Drawings

FLAME RETARDANT AND A FLAME-RETARDANT RESIN COMPOSITION CONTAINING THE SAME

FIELD OF THE INVENTION

The present invention relates to a novel flame retardant and a flame-retardant resin composition containing the same, the resin composition having a good flame resistance, high mechanical strength, and satisfactory extrudate appearance, and being free of chalking, so that the resin composition can be effectively used as a covering or insulation material for electric wires or cables, flame arresting material, wall material, etc.

BACKGROUND INFORMATION

Coverings and insulations for electric wires and cables are conventionally formed using thermoplastic resins, such as olefin resin, which have outstanding extrudability and electrical insulating properties. Recently, there has been an increasing demand for flame-retarded versions of these materials.

In general, these thermoplastic resins are flame-retarded by being mixed with compounds which contain halogens such as chlorine and bromine.

Insulation or sheath materials for those electric wires or cables used in vehicles and nuclear power stations are required to have a flame resistance high enough to withstand, for example, the VW-1 flame test of UL Subj. 758, vertical flame test of ICEA S-61-402, and vertical tray flame test of IEEE std. 383. For their tensile properties, these materials are expected to have the tensile strength of 1.0 kg/mm$^2$ or more and an elongation percentage of 350% or more, as provided for polyethylene by the JIS. Also, the materials are standardized with respect to the rate of production of hydrochloric acid gas. For cables used in nuclear power stations, in particular, the halogen gas production rate of the materials in combustion must be less than 100 mg/g.

A resin composition containing the aforementioned halogen-contained compounds certainly has a satisfactory flame resistance and other good properties. When it burns, however, the composition produces plenty of black smoke containing gases which are harmful to health or tend to corrode metal and the like.

Conventionally known is a method for avoiding such an awkward situation. According to this method, the thermoplastic resins are mixed with metal oxide hydrates, such as aluminum hydroxide and magnesium hydroxide, for use as flame retardants, which are very low in smoking property, harmfulness, and corrosiveness.

The use of the metal oxide hydrates, however, entails the following problems to be solved.

First, the thermoplastic resins should be mixed with a large quantity of the metal oxide hydrates, in order to withstand, for example, the VW-1 flame test provided by UL Subj. 758. If these inorganic materials are compounded in plenty, however, the resulting resin composition will be lowered in mechanical and electrical properties. In particular, the tensile properties will be considerably lowered.

Secondly, these metal oxide hydrates produce the flame retarding effect by causing dehydration. However, the dehydration suddenly occurs within a specific temperature range, so that it can contribute to only part of a series of reactions, including heating, fusion, decomposition, and ignition, before the firing of the polymer, and after all, the resulting resin composition is liable to fail to withstand the VW-1 flame test. If the metal oxide hydrates are compounded in plenty, in particular, the obtained resin composition may certainly be improved in oxygen index, as a yardstick of the flame resistance. However, ash produced by the combustion, which serves to restrain the fusion of the polymer, is too soft to keep its shape, so that the composition cannot withstand the VW-1 flame test.

Thirdly, if magnesium hydroxide is used as a flame retardant for a cable covering or sheath, for example, it will react with carbon dioxide in the ambient air, thereby producing magnesium carbonate, which will be separated on the surface of the covering or sheath, thus entailing chalking. Although this chalking effect has no bad influence upon the properties of the cable covering or sheath, it spoils the external appearance of the product and lowers its commercial value.

SUMMARY OF THE INVENTION

An object of the present ivention is to provide an flame retardant having so high a flame resistance that no harmful or corrosive gases can be produced during combustion.

Another object of the invention is to provide a flame-retardant resin composition obtained by compounding a thermoplastic resin with the flame retardant of the invention, the resin composition having a flame resistance high enough to withstand the VW-1 flame test.

Still another object of the invention is to provide a flame-retardant resin composition having satisfactory tensile properties and free of surface chalking.

In order to achieve the above objects, according to the present invention, there is provided a flame retardant comprising a mixture of 10 to 90% by weight of a powder A and 90 to 10% by weight of a powder B of magnesium hydroxide, the powder A containing 40 to 70% by weight of a powdered double salt of magnesium carbonate and calcium carbonate and 60 to 30% by weight of powdered basic magnesium carbonate.

According to the present invention, moreover, there is provided a flame-retardant resin composition comprising 100 parts by weight of a thermoplastic resin and 30 to 300 parts by weight of the flame retardant described above.

DETAILED DESCRIPTION

First, a flame retardant according to the present invention is a powder mixture of powder A and B mentioned later.

The powder A contains a powdered double salt of magnesium carbonate and calcium carbonate and powdered basic magnesium carbonate.

The double salt may be dolomite (CaMg(CO$_3$)$_2$) or huntite (CaMg$_3$(CO$_3$)$_4$), preferably huntite. Huntite is a white crystal.

The basic magnesium carbonate, for use as the other component of the powder A, is hydromagnesite, which may, for example, be given by the formula Mg$_4$(CO$_3$)$_3$(OH)$_2$.3H$_2$O or Mg$_5$(CO$_3$)$_4$(OH)$_2$.4H$_2$O.

In this powder A, the content of the powdered double salt is set to 40 to 70% by weight, that is, the content of the powdered basic magnesium carbonate ranges from 30 to 60% by weight.

If the powder A contains less than 40% by weight of the powdered double salt (or more than 60% by weight of the powdered basic magnesium carbonate), it is subjected to a foaming effect, which is attributable to the removal of water of crystallization of the basic magnesium carbonate, when the powder A is mixed with a thermoplastic resin to form a resin composition. In such a case, the resulting product cannot enjoy a satisfactory extrudate appearance. If the powder A contains more than 70% by weight of the powdered double salt (or less than 30% by weight of the powdered basic magnesium carbonate), the flame resistance of the obtained flame retardant is lowered, so that the flame resistance of the resulting resin composition is also lowered.

Preferably, the powder A contains 40 to 60% by weight of the double salt and 60 to 40% by weight of the basic magnesium carbonate.

Most desirably, the powder A contains 50 to 55% by weight of huntite, for use as the double salt, and 50 to 45% by weight of hydromagnesite, as the basic magnesium carbonate.

The powder A may suitably contain a small amount of any other carbonate or inorganic salts, such as aluminum, iron, potassium, silicon, etc., beside the aforementioned two components. These two components of the powder A should preferably be of fine particles, in view of the dispersibility of the powder A in thermoplastic resin and the formability and mechanical properties of the resin composition. Preferably, the average particle size of the components ranges from 0.5 to 10 $\mu$m.

Although the powder A may be prepared by mixing the aforesaid two components in a predetermined ratio, it may be "ULTRACARB" (trademark) commerically available from Microfine Minerals and Chemicals Limited, as an example of a natural product.

Magnesium hydroxide, for use as the powder B, can be used without any special restrictions. Preferably, however, the average particle size and BET specific surface area of the powder B should be 0.2 to 10 $\mu$m and 30 $m^2/g$ or less, respectively, in view of the dispersibility in thermoplastic resin and the formability and mechanical properties of the resulting resin composition. In particular, the powder B should preferably have particles each in the form of a thick hexagonal plate, average particle size of 0.5 to 5 $\mu$m, BET specific surface area of 20 $m^2/g$ or less, and oil absorption of 25 to 40 ml/100 g.

In the powder mixture according to the present invention, the mixture ratio of the powder B set to range from 10 to 90% by weight, and therefore, that of the powder A is set range from 90 to 10% by weight. If the mixture ratio of the powder B is less than 10% by weight (or if that of the powder A exceeds 90% by weight), the required flame resistance cannot be obtained. If the mixture ratio of the powder B exceeds 90% by weight (or if that of the powder A is less than 10% by weight), the chalking caused by carbon dioxide in the atmosphere is conspicuous. The powder mixture preferably contains 30 to 70% by weight of the powder B and 70 to 30% by weight of the powder A.

The powder mixture described above may be used directly as the flame retardant according to the present invention. Preferably, however, the powder mixture should be collectively surface-treated for the use.

In contrast with a powder mixture obtained by mixing the powders A and B after they are separately surface-treated, the collectively surface-treated powder mixture ensures very good dispersibility in thermoplastic resin, satisfactory mechanical properties of the resulting resin composition, and improved low-temperature brittleness. Since the secondary aggregation of the particles of the powders A and B is reduced, the resulting product is much improved in external appearance.

The reason why the effect of the surface treatment increases when the mixture of the powders A and B is collectively surface-treated is not clarified yet. A possible reason is that the agitative mixing of the different powders with a surface treatment agent increases the chance for the powder particles to be in contact with one another, so that the effect of the surface treatment is greater than in the case where the two powders are separately surface-treated before they are mixed.

The surface treatment agent used for this surface treatment may be selected out of various materials, including silane coupling agents, such as vinyltriethhoxysilane and $\gamma$-mercaptopropyl-trimethoxysilane, titanate coupling agents such as isopropyltriisostearoyltitanate, and higher fatty acids, such as stearic acid, oleic acid, palmitic and behenic acid, and metallic salts thereof.

The tensile strength of the resin composition, as the final product, can be improved, in particular, by using an alkaline metallic salt of a higher fatty acid, such as sodium stearate, as the surface treatment agent.

There are no special restrictions on the method of the surface treatment. The powder mixture and the surface treatment agent may be mixed directly with each other by means of a high speed mixer. In an alternative method, the powder mixture is mixed with a solution obtained by dispersing the surface treatment agent in a solvent, and then the solvent is volatilized. In this case, a metallic salt of a higher fatty acid is used as the surface treatment agent. Surface treatment in an aqueous solution of this treatment agent produces no harmful waste matter and is economical.

The mixture ratio of the surface treatment agent, compared with 100 parts by weight of the powder mixture, ranges from 0.3 to 8 parts by weight, preferably from 0.5 to 5 parts, and more desirably, from 2 to 5 parts. If the mixture ratio of the treatment agent is less than 0.3 parts by weight, the effect of the surface treatment is not satisfactory. If the ratio exceeds 8 parts by weight, the effect is saturated and cannot be improved any more.

Thus, the flame-retardant resin composition according to the present invention is prepared by mixing the thermoplastic resin with the mixture of the powders A and B, of by mixing the thermoplastic resin with the surface-treated powder prepared by treating the surface of the powder mixture in the aforementioned manner.

The thermoplastic resin used may be selected out of various materials, including high-density polyethylene, medium-density polyethylene, low-density polyethylene, linear low-density polyethylene, and very-low-density polyethylene; copolymers of ethylene and $C_3$–$C_{12}$ $\alpha$-olefins, such as propylene, butene-1, pentene-1, hexene-1, 4-methylpentene-1, octene-1, decene-1, etc., ethylene propylene copolymer rubber; ethylene propylene diene terpolymer rubber; copolymers of ethylene and polar group contained monomers, such as vinyl acetate, ethyl acrylate, methacrylic acid, ethyl methacrylate, maleic acid, maleic anhydride, etc.; polymers obtained by degenerating ethylene or copolymers of ethylene and $\alpha$-olefins by means of unsaturated fatty acids, such as acrylic acid and maleic acid, or derivatives thereof; mixtures suitably combining the aforesaid materials; polyvinyl chloride; and copolymer of ethylene vinylacetate and vinyl chloride.

Among these materials, linear low-density polyethylene and very-low-density polyethylene, whose density is 0.91 or less, are preferred for the purpose, in view of the improvement of the mechanical properties.

In view of the improvement of the flame resistance, moreover, ethylene vinylacetate copolymer is preferred for use as the thermoplastic resin.

In this case, the vinyl acetate content preferably ranges from 8 to 40% by weight. If the content is less than 8% by weight, the flame resistance is too low. If the content exceeds 40% by weight, the tensile strength of the resulting resin composition is too low for practical use. More desirably, in particular, the vinyl acetate content ranges from 10 to 30% by weight.

If ethylene vinylacetate copolymer is mixed with any of the other resins mentioned before, the aforementioned effect can be produced as long as the vinyl acetate content of the resulting resin composition is within the aforesaid range.

The mixture ratio of the flame retardant is set range from 30 to 300 parts by weight, compared with 100 parts of the thermoplastic resin.

If the mixture ratio of the flame retardant is less than 30 parts by weight, the flame resistance of the resulting resin composition cannot be satisfactorily improved. If the mixture ratio exceeds 300 parts by weight, the mechanical properties are too low. Preferably, the mixture ratio of the flame retardant ranges from 50 to 200 parts by weight, compared with 100 parts of the thermoplastic resin.

The resin composition of the present invention may be cross-linked by means of radiation or a cross-linking agent, in order to introduce cross-linking which is conventionally effected to improve the performance of electric wires or cables. In this case, organic peroxides, such as dicumyl peroxide and 1,3-bis(t-butylperoxyisopropyl)benzene, and silane coupling agents are best suited for use as the cross-linking agent. These materials may be used singly or in combination with auxiliary agents, such as sulfur, ethylene dimethacrylate, diallyl phthalate, trimethylol propane trimethacrylate, triallyl cyanurate, triallyl isocyanurate, p-quinonedioxime. If necessary, the following conventional additives may be used without substantially reducing the effect of the present invention. These additives include other thermoplastic resins than the aforesaid ones; other flame retardants, such as red phosphorus, antimony trioxide, molybdenum oxide, aluminum hydroxide, calcium carbonate, clay, silicon dioxide, and carbon black; synthetic and natural rubbers; organic and inorganic fillers; and antioxidants, such as 4,4-thiobis(3-methyl-6-t-butylphenol), polymer of 2,2,4-trimethyl-1,2-dihydroquinoline, N,N'-di-2-naphthyl-p-phenylenediamine, zinc salt of 2-mercaptobenzimidazole, pentaerythrityl-tetrakis-[3-(3,5-di-t-butyl-4-hydroxyphenyl)-propionate], and 2,2-thio-diethylene bis[3-(3,5-di-t-butyl-4-hydroxyphenyl)-propionate]. The additives further include lubricants such as stearic acid, ultraviolet radiation inhibitors such as 2-hydroxy-4-n-octoxybenzophenone, and copper inhibitors such as 3-(N-salicyloyl)amino-1,2,4-triazole.

The flame-retardant resin composition of this invention is useful as a covering or sheath of an electric wire or cable, and also can be suitable used for a flame spread-preventing material, flame-retardant wall, and the like.

EXAMPLES 1 TO 6 AND CONTROLS 1 TO 3

As shown in Table 1, the individual components were mixed in various ratios, fully kneaded at 150° C. by means of a 8-inch two-axis roll, and formed into sheets of a predetermined thickness by means of a press, thus providing various samples. These individual sheets were pelletized, and extruded to cover soft-copper stranded conductors of 2-mm$^2$ cross-sectional area by means of a 30-mm$\phi$ extruder. Thus, electric wires of 3.4-mm diameter were obtained.

The following properties of the individual samples were measured.

Tensile properties: After sample sheets of 1-mm thickness were left in a thermostatic chamber of 20° C. for a day, samples were stamped out from the sheets by means of a JIS-#3 dumbbell, and their tensile strength (kg/mm$^2$) and elongation percentage (%) were measured at a speed of 200 mm/min by means of a Tensilon produced by Toyo Baldwin Co., Ltd.

Oxygen index: Samples of 6.5-mm width and 150-mm length were stamped out from sample sheets of 3-mm thickness, and their oxygen index was measured in accordance with the oxygen index testing method provided by JIS K 7201.

VW-1 flame test: Samples were brought into contact with flames five times, for 15 seconds for each time, in accordance with the VW-1 vertical flame test provided by UL Subj. 758. Those samples whose indicator flags were damaged only within 25%, without causing absorbent cotton to be ignited, and which flamed only within 60 seconds after each contact with the flame were judged to be acceptable.

Chalking test: Sample sheets of 35 mm×35 mm×1 mm were loaded with heat cycles (four cycles a day) of 0° to 60° C. in CO$_2$ atmosphere at a relative humidity of 95% for four days. The surface conditions were observed in this state. In Table 1, ⊙, ○, and × represent "no substantial chalking," "slight chalking," and "significant chalking," respectively.

Extrudate appearance: The extrudate appearance was observed with the naked eye during the manufacture of the electric wires. In Table 1, ⊙, ○, and × represent "good," "moderate," and "poor," respectively. Among these evaluation decisions, ⊙ and ○ indicate acceptance.

Brittleness temperature: Samples of 6.0-mm width and 38-mm length were stamped out from sample sheets of 2-mm thickness, and their brittleness temperature was measured in accordance with the cold resistance testing method provided by JIS K 6760.

The results of these tests are collectively shown in Table 1.

TABLE 1

|  | Embodiment No. | | | | | | Control No. | | |
| --- | --- | --- | --- | --- | --- | --- | --- | --- | --- |
|  | 1 | 2 | 3 | 4 | 5 | 6 | 1 | 2 | 3 |
| Composition (Parts by weight) | | | | | | | | | |
| Thermoplastic resins | | | | | | | | | |
| Ethylene vinylacetate copolymer | 100 | 100 | 100 | 100 | — | — | 100 | 100 | 100 |

TABLE 1-continued

| | Embodiment No. | | | | | | Control No. | | |
|---|---|---|---|---|---|---|---|---|---|
| | 1 | 2 | 3 | 4 | 5 | 6 | 1 | 2 | 3 |
| Ethylene ethylacrylate copolymer | — | — | — | — | 100 | — | — | — | — |
| Very-low-density polyethylene | — | — | — | — | — | 100 | — | — | — |
| Powder A | | | | | | | | | |
| Huntite | 18 | 24 | 27 | 40 | 24 | 24 | 45 | 4 | 40 |
| Hydromagnesite | 22 | 16 | 33 | 40 | 16 | 16 | 48 | 4 | 10 |
| Powder B | | | | | | | | | |
| Magnesium hydroxide | 60 | 60 | 40 | 70 | 60 | 60 | 7 | 92 | 50 |
| Other additives | | | | | | | | | |
| Carbon black | 4 | 4 | 4 | 4 | 4 | 4 | 4 | 4 | 4 |
| Stearic acid | 1 | 1 | 1 | 1 | 1 | 1 | 1 | 1 | 1 |
| Irganox 1010 | 1 | 1 | 1 | 1 | 1 | 1 | 1 | 1 | 1 |
| Properties | | | | | | | | | |
| Tensile strength (kg/mm$^2$) | 1.3 | 1.3 | 1.2 | 1.1 | 1.3 | 1.2 | 1.2 | 1.3 | 1.2 |
| Elongation percentage (%) | 550 | 550 | 520 | 450 | 550 | 530 | 520 | 580 | 510 |
| Oxygen index | 33 | 31 | 33 | 35 | 31 | 30 | 30 | 33 | 32 |
| VW-1 test results | ⊙ | ⊙ | ⊙ | ⊙ | ⊙ | ⊙ | × | ⊙ | × |
| Chalking test results | ○ | ⊙ | ⊙ | ○ | ⊙ | ⊙ | ⊙ | × | ⊙ |
| Extrudate appearance | ⊙ | ⊙ | ⊙ | ○ | ⊙ | ⊙ | ○ | ⊙ | ⊙ |
| Brittleness temperature (°C.) | −50 | −51 | −50 | −42 | −55 | −50 | −47 | −52 | −53 |

EXAMPLES 7 TO 20 AND CONTROLS 4 TO 6

Various flame retardants were prepared in the following manner.

Flame Retardant A

A powder mixture was obtained by mixing 1,000 g of an equivalent mixture (powder A) of huntite and hydromagnesite, having the 50% cumulative particle size (based on the laser-diffraction particle size measuring method) of 3.0 μm, with 1,000 g of magnesium hydroxide (powder B) with the 50% cumulative particle size of 1.3 μm. 10 l of water containing the obtained powder mixture was mixed with 30 l of an aqueous solution containing 80 g of sodium stearate, and the resulting solution was stirred at 70° C. for 120 minutes. Then, the solution was filtered, and the residue was washed and dried at 110° C. for 48 hours. The resulting dry cake was crushed by means of a high speed mixer.

The obtained powder consisted of 25% of huntite, 25% of hydromagnesite, and 50% of magnesium hydroxide, all by weight, and its particles were coated with 3.5 parts by weight of sodium stearate, compared with 100 parts of the powder.

Flame Retardant B

A flame retardant B was obtained in the same manner as the flame retardant A, provided that the powder mixture contained 33 parts by weight of the equivalent mixture of huntite and hydromagnesite and 67 parts by weight of magnesium hydroxide.

Flame Retardant C

A flame retardant C was obtained in the same manner as the flame retardant A, provided that the powder mixture contained 70 parts by weight of the powder A, which contained huntite and hydromagnesite in the ratio 2:1 by weight, and 30 parts by weight of magnesium hydroxide.

Flame Retardant D

A silane-coated flame retardant D was obtained by agitatively mixing 1,400 g of a powder, which contained huntite and hydromagnesite in the ratio 1:2 by weight, 600 g of magnesium hydroxide, and 2 l of ethanol solution containing 53.8 g of vinyltrimethoxysilane (KBM1003, Shin-etsu Kagaku Co., Ltd.), drying the resulting mixture at 100° C. for 48 hours, and further heat-treating the mixture at 150° C. for 4 hours.

Flame Retardant E

A flame retardant was prepared in the same manner as the flame retardant D, using 1,000 g of an equivalent mixture of huntite and hydromagnesite and 1,000 g of magnesium hydroxide. Then, 1 part by weight of stearic-acid amide was added to 100 parts by weight of the prepared flame retardant, and the resulting mixture was quickly stirred. A flame retardant E coated successively with silane and stearic-acid amide was obtained by heat-treating the resulting mixture at 150° C. for an hour.

Flame Retardant F

A flame retardant F was obtained by equivalently mixing the equivalent mixture (powder A) of huntite and hydromagnesite, used for the preparation of the flame retardant A, with magnesium hydroxide (powder B), each in the form of a water slurry, and then drying the resulting mixture at 100° C. for 48 hours.

Flame Retardant G

Magnesium hydroxide in the form of a water slurry was surface-treated with sodium stearate.

Flame Retardant H

A flame retardant H was prepared in the same manner as the flame retardant A, provided that aluminum hydroxide was used in place of magnesium hydroxide.

Flame Retardant I

A flame retardant I was prepared by treating the following mixture in the same manner as the flame retardant A. The mixture was prepared by equivalently mixing powder (powder A) of ULTRACARB (trademark; produced by Microfine Minerals and Chemicals Limited) with powdered magnesium hydroxide (powder B). The ULTRACARB is a mixture of 51% by weight of huntite and 49% by weight of hydromagnesite, whose 50% cumulative particle size (based on the laser-diffraction particle size measuring method) is 3.0 μm.

These various flame retardants were mixed with the thermoplastic resins shown in Table 2 in various ratios (part by weight). Thus, resin compositions were prepared in the same manner as in Examples 1 to 6, and were used to manufacture covered electric wires.

Various properties of these individual resin compositions were measured in the same manner as in Examples 1 to 6. The measurement results are collectively shown in Table 2.

TABLE 2

|  | Embodiment No. | | | | | | | | | | | | | | Control No. | | |
|---|---|---|---|---|---|---|---|---|---|---|---|---|---|---|---|---|---|
|  | 7 | 8 | 9 | 10 | 11 | 12 | 13 | 14 | 15 | 16 | 17 | 18 | 19 | 20 | 4 | 5 | 6 |
| Composition (parts by weight) | | | | | | | | | | | | | | | | | |
| Thermoplastic resin | | | | | | | | | | | | | | | | | |
| Ethylene vinylacetate copolymer *1 | 100 | 100 | 100 | 100 | 100 | 100 | 100 | 100 | 100 | — | — | — | 70 | 100 | 100 | 100 | — |
| Ethylene ethylacrylate copolymer *2 | — | — | — | — | — | — | — | — | — | 100 | — | — | — | — | — | — | — |
| Very-low-density polyethylene *3 | — | — | — | — | — | — | — | — | — | — | 100 | — | — | — | — | — | 100 |
| Linear-low-density polyethylene *4 | — | — | — | — | — | — | — | — | — | — | — | 100 | 30 | — | — | — | — |
| Flame retardants | | | | | | | | | | | | | | | | | |
| A | 40 | 60 | 100 | — | — | — | — | — | 180 | 100 | 100 | 100 | 100 | — | — | — | 350 |
| B | — | — | — | 100 | — | — | — | — | — | — | — | — | — | — | — | — | — |
| C | — | — | — | — | 100 | — | — | — | — | — | — | — | — | — | — | — | — |
| D | — | — | — | — | — | 100 | — | — | — | — | — | — | — | — | — | — | — |
| E | — | — | — | — | — | — | 100 | — | — | — | — | — | — | — | — | — | — |
| F | — | — | — | — | — | — | — | 100 | — | — | — | — | — | — | — | — | — |
| G | — | — | — | — | — | — | — | — | — | — | — | — | — | — | 100 | — | — |
| H | — | — | — | — | — | — | — | — | — | — | — | — | — | — | — | 100 | — |
| I | — | — | — | — | — | — | — | — | — | — | — | — | — | 100 | — | — | — |
| Other additives | | | | | | | | | | | | | | | | | |
| Carbon black | 4 | 4 | 4 | 4 | 4 | 4 | 4 | 4 | 4 | 4 | 4 | 4 | 4 | 4 | 4 | 4 | 4 |
| Irganox 1010 *5 | 1 | 1 | 1 | 1 | 1 | 1 | 1 | 1 | 1 | 1 | 1 | 1 | 1 | 1 | 1 | 1 | 1 |
| Stearic acid | 1 | 1 | 1 | 1 | 1 | 1 | 1 | 1 | 1 | 1 | 1 | 1 | 1 | 1 | 1 | 1 | 1 |
| Properties | | | | | | | | | | | | | | | | | |
| Tensile strength (kgf/mm$^2$) | 1.6 | 1.5 | 1.3 | 1.3 | 1.3 | 1.4 | 1.4 | 1.3 | 1.0 | 1.3 | 1.3 | 1.2 | 1.3 | 1.3 | 1.3 | 1.2 | 0.5 |
| Elongation percentage (%) | 700 | 700 | 650 | 660 | 660 | 650 | 660 | 600 | 450 | 580 | 600 | 500 | 560 | 650 | 580 | 500 | 50 |
| Oxygen index | 28 | 29 | 32 | 34 | 33 | 34 | 33 | 33 | 39 | 30 | 28 | 28 | 30 | 33 | 26 | 25 | 41 |
| VW-1 test results | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | × | ⊙ |
| Chalking test results | ⊙ | ⊙ | ⊙ | ⊙ | ⊙ | ⊙ | ⊙ | ⊙ | ⊙ | ⊙ | ⊙ | ⊙ | ⊙ | ⊙ | × | ⊙ | × |
| Extrudate appearance | ⊙ | ⊙ | ⊙ | ⊙ | ⊙ | ⊙ | ⊙ | ○ | ⊙ | ⊙ | ⊙ | ⊙ | ⊙ | ⊙ | ⊙ | × | × |
| Brittleness temperature (°C.) | <−60 | −60 | −53 | −55 | −55 | −58 | −58 | −52 | −28 | −56 | −53 | −50 | −55 | −55 | −52 | −40 | −10 |

*1 MI 1.0 g/10 min; vinyl acetate content = 26 wt %
*2 MI 0.75 g/10 min; ethyl acrylate content = 15 wt %
*3 MI 0.4 g/10 min; density = 0.90
*4 MI 0.8 g/10 min; density = 0.92
*5 Antioxidant

EXAMPLES 21 AND 22 AND CONTROLS 7 AND 8

Polyvinyl chloride with the average polymerization degree of 1,300 was mixed with the components shown in Table 3 in various ratios (part by weight). Thus, resin compositions were prepared in the same manner as in Examples 7 to 20, and were used to manufacture covered electric wires.

Various properties of these individual resin compositions were measured in the same manner as in Examples 7 to 20. The measurement results are collectively shown in Table 3.

TABLE 3

|  | Embodiment No. | | Control No. | |
|---|---|---|---|---|
|  | 21 | 22 | 7 | 8 |
| Composition (parts by weight) | | | | |
| Polyvinyl chloride | 100 | 100 | 100 | 100 |
| Flame retardants | | | | |
| A | 50 | — | 20 | — |
| G | — | — | — | 100 |
| I | — | 80 | — | — |
| Other additives | | | | |
| Carbon Black | 4 | 4 | 4 | 4 |
| Stearic acid | 1 | 1 | 1 | 1 |
| Dioctyl phthalate | 50 | 50 | 50 | 50 |
| Tribasic sulfate | 5 | 5 | 5 | 5 |
| Antimony trioxide | 5 | 5 | 5 | 5 |
| Properties | | | | |
| Tensile strength (kgf/mm$^2$) | 2.0 | 1.8 | 2.2 | 1.8 |
| Elongation percentage (%) | 290 | 270 | 300 | 250 |
| Oxygen index | 30 | 34 | 28 | 32 |
| VW-1 test results | ⊙ | ⊙ | × | ⊙ |
| Chalking test results | ⊙ | ⊙ | ⊙ | × |
| Extrudate appearance | ⊙ | ⊙ | ⊙ | ⊙ |
| Brittleness temperature (°C.) | −21 | −18 | −26 | −18 |

What is claimed is:

1. A flame retardant comprising a mixture of 10 to 90% by weight of a powder A and 90 to 10% by weight of a powder B of magnesium hydroxide, said powder A comprising 40 to 70% by weight of a powdered huntite, and 60 to 30% by weight of powdered hydromagnesite.

2. The flame retardant according to claim 1, wherein 30 to 70% by weight of said powder A is mixed with 70 to 30% by weight of said powder B.

3. The flame retardant according to claim 1, wherein said powder A contains 50 to 55% by weight of huntite and 50 to 45% by weight of hydromagnesite.

4. The flame retardant according to claim 1, wherein said powder mixture is treated as a whole with a surface treatment agent after mixing said powder A with said powder B.

5. The flame retardant according to claim 4, wherein said surface treatment agent is a material or a mixture of materials selected from the group consisting of a silane coupling agent, a titanate coupling agent, and a higher fatty acid and a metallic salt of said higher fatty acid.

6. The flame retardant according to claim 4, wherein said surface treatment agent is a metallic salt of a higher fatty acid selected from the group of consisting of stearic acid, oleic acid, palmitic acid, and behenic acid.

7. The flame retardant according to claim 6, wherein said powder mixture is surface-treated in an aqueous solution of the surface treatment agent.

8. The flame retardant according to claim 4, wherein 100 parts by weight of said powder mixture is treated with 0.3 to 8 parts by weight of the surface treatment agent.

9. The flame retardant according to claim 1, wherein the average particle size of said powder A is from 0.5 to 10 μm.

10. The flame retardant according to claim 1, wherein the average particle size of said powder B is from 0.2 to 10 μm, and the BET specific surface area of said powder B is 30 m$^2$/g or less.

11. The flame-retardant according to claim 1, wherein the hydromagnesite is of the formula $Mg_4(CO_3)_3(OH)_2.3H_2O$ or $Mg_5(CO_3)_4(OH)_2.4H_2O$.

12. A flame-retardant resin composition comprising:
100 parts by weight of a thermoplastic resin; and
30 to 300 parts by weight of a flame retardant comprising a mixture of 10 to 90% by weight of a powder A and 90 to 10% by weight of a powder B of magnesium hydroxide, said powder A comprising 40 to 70% by weight of a powdered huntite, and 60 to 30% by weight of powdered hydromagnesite.

13. The flame-retardant resin composition according to claim 12, wherein 30 to 70% by weight of said powder A is mixed with 70 to 30% by weight of said powder B.

14. The flame-retardant resin composition according to claim 12, wherein said powder A contains 50 to 55% by weight of huntite and 50 to 45% by weight of hydromagnesite.

15. The flame-retardant resin composition according to claim 12, wherein said powder mixture is treated as a whole with a surface treatment agent after mixing said powder A with said powder B.

16. The flame-retardant resin composition according to claim 15, wherein said surface treatment agent is a material or a mixture of materials selected from the group consisting of a silane coupling agent, a titanate coupling agent, and a higher fatty acid and a metallic salt of said higher fatty acid.

17. The flame-retardant resin composition according to claim 15, wherein said surface treatment agent is a metallic salt of a higher fatty acid selected from the group of consisting of stearic acid, oleic acid, palmitic acid, and behenic acid.

18. The flame-retardant resin composition according to claim 17, wherein said powder mixture is surface-treated in an aqueous solution of the surface treatment agent.

19. The flame-retardant resin composition according to claim 15, wherein 100 parts by weight of said powder mixture is treated with 0.3 to 8 parts by weight of the surface treatment agent.

20. The flame-retardant resin composition according to claim 12, wherein the average particle size of said powder A is from 0.5 to 10 μm.

21. The flame-retardant resin composition according to claim 12, wherein the average particle size of said powder B is from 0.2 to 10 μm, and the BET specific surface area of said powder B is 30 m$^2$/g or less.

22. A flame-retardant resin composition according to claim 12, wherein said thermoplastic resin is at least one material selected from the group consisting of high-density polyethylene, medium-density polyethylene, low-density polyethylene, very-low-density polyethylene, linear low-density polyethylene, copolymers of ethylene and $C_3$–$C_{12}$ α-olefins, ethylene propylene copolymer rubber, ethylene propylene diene terpolymer rubber, copolymers of ethylene and polar group contained monomers, polyvinyl chloride, and copolymer of ethylene vinylacetate and vinyl chloride.

23. A flame-retardant resin composition according to claim 22, wherein said copolymer of ethylene and polar group contained monomers is ethylene vinylacetate copolymer containing 8 to 40% by weight of vinyl acetate.

24. A flame-retardant resin composition according to claim 12, further comprising an antioxidant selected from the group consisting of 4,4-thiobis(3-methyl-6-t-butylphenol), polymer of 2,2,4-trimethyl-1,2-dihydroquinoline, N,N'-di-2-naphthyl-p-phenylenediamine, zinc salt of 2-mercaptobenzimidazole, pentaerythrityl-tetrakis-[3-(3,5-di-t-butyl-4-hydroxyphenyl)-propionate], and 2,2-thio-diethylene bis[3-(3,5-di-t-butyl-4-hydroxyphenyl)-propionate].

25. A flame-retardant resin composition according to claim 12, further comprising a material selected from the group consisting of red phosphorus, antimony trioxide, molybdenum oxide, aluminum hydroxide, calcium carbonate, clay, silicon dioxide, and carbon black.

26. An electric wire or a cable comprising a sheath or an insulation formed of the flame-retardant resin composition according to claim 12.

27. A fire-arresting material formed of the flame-retardant resin composition according to claim 12.

28. A wall material formed of the flame-retardant resin composition according to claim 12.

29. A flame-retardant resin composition comprising:
100 parts by weight of a thermoplastic resin; and
30 to 300 parts by weight of a flame retardant comprising a mixture of 10 to 90% by weight of a powder A and 90 to 10% by weight of powder B of magnesium hydroxide, said powder A comprising 40 to 70% by weight of a powdered huntite, and 60 to 30% by weight of powdered hydromagnesite, and said powder mixture being treated with a surface treatment agent.

30. A flame-retardant resin composition comprising:
100 parts by weight of a thermoplastic resin; and
50 to 200 parts by weight of a flame retardant comprising a mixture of 30 to 70% by weight of a powder A and 70 to 30% by weight of powder B of magnesium hydroxide, said powder A comprising 40 to 70% by weight of a powdered huntite, and 60 to 30% by weight of powdered hydromagnesite, and said powder mixture being treated with a surface treatment agent.

31. The flame-retardant according to claim 9, wherein the powder B has an average particle size of 0.5 to 5 μm, a BET specific surface area of 20 m$^2$/g or less and an oil absorption of 25 to 40 ml/100 g and wherein the hydromagnesite is of the formula $Mg_4(CO_3)_3(OH)_2 \cdot 3H_2O$ or $Mg_5(CO_3)_4OH_2 4H_2O$.

32. The flame-retardant according to claim 5, wherein the hydromagnesite is of the formula $Mg_4(CO_3)_3(OH)_2.3H_2O$ or $Mg_5(CO_3)_4OH_2.4H_2O$; the surface treatment agent is a coupling agent selected from the group consisting of vinyltriethoxysilane, γ-mercaptopropyltrimethoxysilane and isopropyltriisostearoyltitanate; and 100 parts by weight of the powder mixture is treated with 2 to 5 parts by weight of the surface treatment agent.

33. The flame-retardant composition according to claim 20, wherein the thermoplastic resin is at least one resin selected from the group consisting of copolymers of ethylene and a $C_3$–$C_{12}$ α-olefin selected from the group consisting of propylene, butene-1, pentene-1, hexene-1, 4-methylpentene-1, octene-1 and decene-1; and copolymers of ethylene and a polar group contained monomer selected from the group consisting of vinyl acetate, ethyl acrylate, methacrylic acid, ethyl methacrylate, maleic acid and maleic anhydride and wherein powder B has an average particle size of 0.5 to 5 μm, a BET specific surface area of 20 m$^2$/g or less and an oil absorption of 25 to 40 ml/100 g.

34. The flame-retardant composition according to claim 12, wherein the flame retardant is in an amount of 50 to 200 parts by weight; the thermoplastic resin is selected from the group consisting of ethylene vinylacetate copolymer and polyethylene, the polyethylene having a density of 0.91 or less; the hydromagnesite is of the formula $(Mg)_4(CO_3)_3(OH)_2.3H_2O$ or $Mg_5(CO_3)_4OH_2.4H_2O$; powder A has an average particle size of 0.5 to 10 μm and powder B has an average particle size of 0.5 to 5 μm, a BET specific surface area of 20 m$^2$/g or less and an oil absorption of 25 to 40 ml/100 g.

35. The flame-retardant composition according to claim 30, wherein the powder A has an average particle size of 0.5 to 10 μm, the powder B has an average particle size of 0.2 to 10 μm and a BET specific surface area of 30 m$^2$/g or less, the hydromagnesite is of the formula $Mg_4(CO_3)_3(OH)_2.3H_2O$ or $Mg_5(CO_3)_4OH_2.4H_2O$ and the thermoplastic resin is selected from the group consisting of ethylene vinylacetate copolymer having a vinyl acetate content of 10 to 30% by weight and polyethylene having a density of 0.91 or less.

36. The flame-retardant composition according to claim 35, wherein 100 parts by weight of the powder mixture is treated with 2 to 5 parts by weight of the surface treatment agent and the surface treatment agent is a material or a mixture of materials selected from the group consisting of a silane coupling agent; a titanate coupling agent; and a higher fatty acid and a metallic salt of a higher fatty acid selected from the group consisting of stearic acid, oleic acid, palmitic acid and behenic acid.

* * * * *